(12) United States Patent
Seki

(10) Patent No.: US 7,849,086 B2  
(45) Date of Patent: Dec. 7, 2010

(54) DOCUMENT PROCESSOR AND COMPUTER READABLE MEDIUM

(75) Inventor: Takayuki Seki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 432 days.

(21) Appl. No.: 12/000,077

(22) Filed: Dec. 7, 2007

(65) Prior Publication Data

US 2008/0313221 A1    Dec. 18, 2008

(30) Foreign Application Priority Data

Jun. 15, 2007    (JP)    ............... 2007-159393

(51) Int. Cl.  
*G06F 7/00*    (2006.01)  
*G06F 17/30*    (2006.01)

(52) U.S. Cl. ............... 707/736; 707/741; 707/748; 707/750

(58) Field of Classification Search ............... None  
See application file for complete search history.

(56) References Cited

U.S. PATENT DOCUMENTS

2006/0224590 A1 *    10/2006    Boozer et al. ............... 707/9

2008/0195586 A1 *    8/2008    Arnold et al. ............... 707/3

FOREIGN PATENT DOCUMENTS

JP    A-2001-109772    4/2001  
JP    A-2004-206468    7/2004

* cited by examiner

*Primary Examiner*—Jay A Morrison  
(74) *Attorney, Agent, or Firm*—Oliff & Berridge, PLC

(57) ABSTRACT

A document processor includes: a processing unit that performs a process instructed by a user to an electronic document; a first storing unit that stores at least one of keywords of an attribute element respectively for a plurality of attribute elements; a second storing unit that coordinates at least one attribute element of the plurality of attribute elements with a user, and that stores the at least one attribute element; a determining unit that determines whether or not the stored keyword is included in the processed electronic document; an attribute element specifying unit that specifies the attribute element of the plurality of attribute elements satisfying a prescribed condition on the basis of a keyword determined to be included in the electronic document; and an inquiry unit that inquires about whether or not the specified attribute element is allowed to be stored in the second storing unit.

11 Claims, 13 Drawing Sheets

FIG. 5

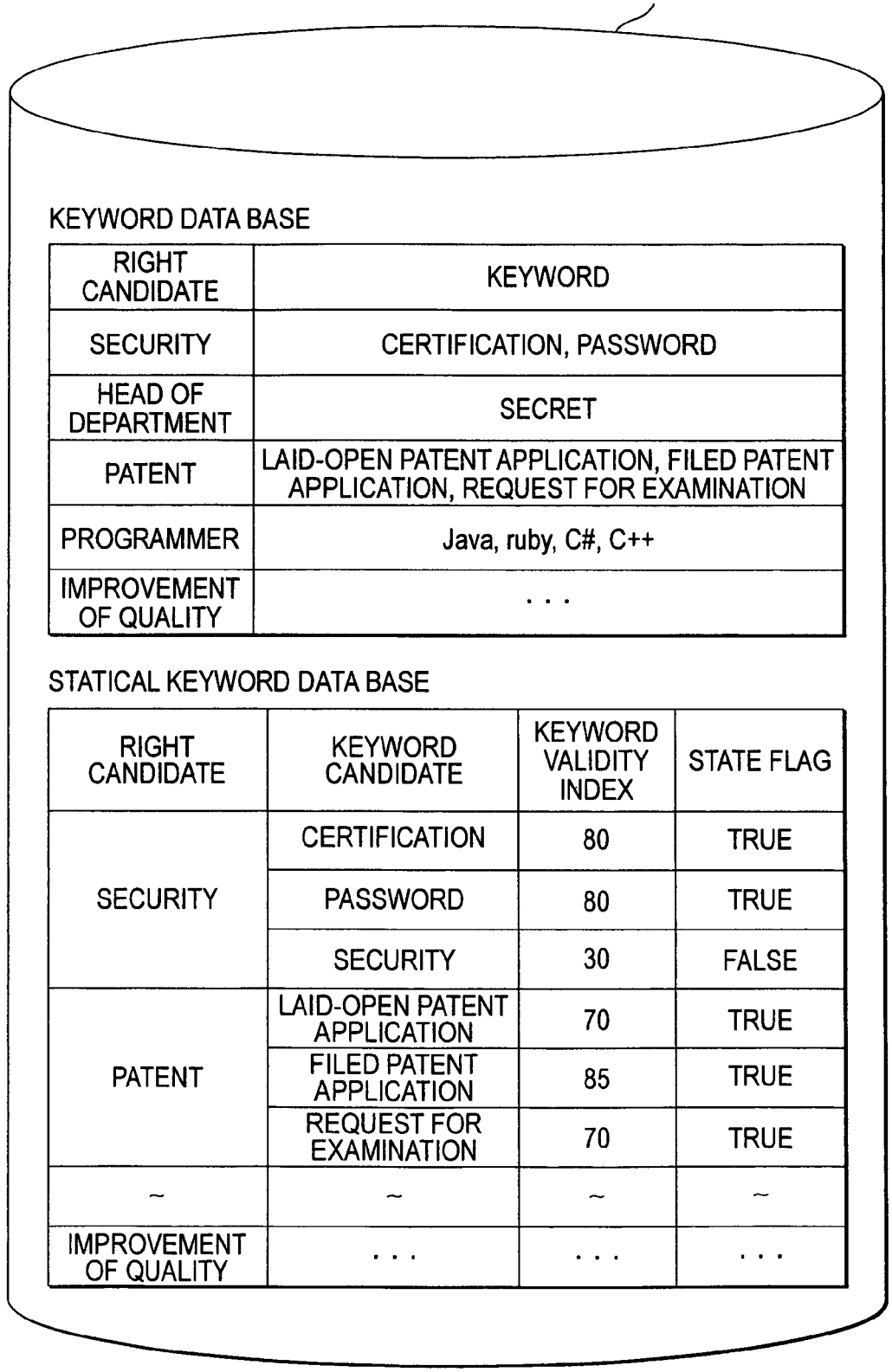

RIGHT CANDIDATE DATA BASE

KEYWORD DATA BASE

| RIGHT CANDIDATE | KEYWORD |
|---|---|
| SECURITY | CERTIFICATION, PASSWORD |
| HEAD OF DEPARTMENT | SECRET |
| PATENT | LAID-OPEN PATENT APPLICATION, FILED PATENT APPLICATION, REQUEST FOR EXAMINATION |
| PROGRAMMER | Java, ruby, C#, C++ |
| IMPROVEMENT OF QUALITY | ... |

STATICAL KEYWORD DATA BASE

| RIGHT CANDIDATE | KEYWORD CANDIDATE | KEYWORD VALIDITY INDEX | STATE FLAG |
|---|---|---|---|
| SECURITY | CERTIFICATION | 80 | TRUE |
|  | PASSWORD | 80 | TRUE |
|  | SECURITY | 30 | FALSE |
| PATENT | LAID-OPEN PATENT APPLICATION | 70 | TRUE |
|  | FILED PATENT APPLICATION | 85 | TRUE |
|  | REQUEST FOR EXAMINATION | 70 | TRUE |
| ~ | ~ | ~ | ~ |
| IMPROVEMENT OF QUALITY | ... | ... | ... |

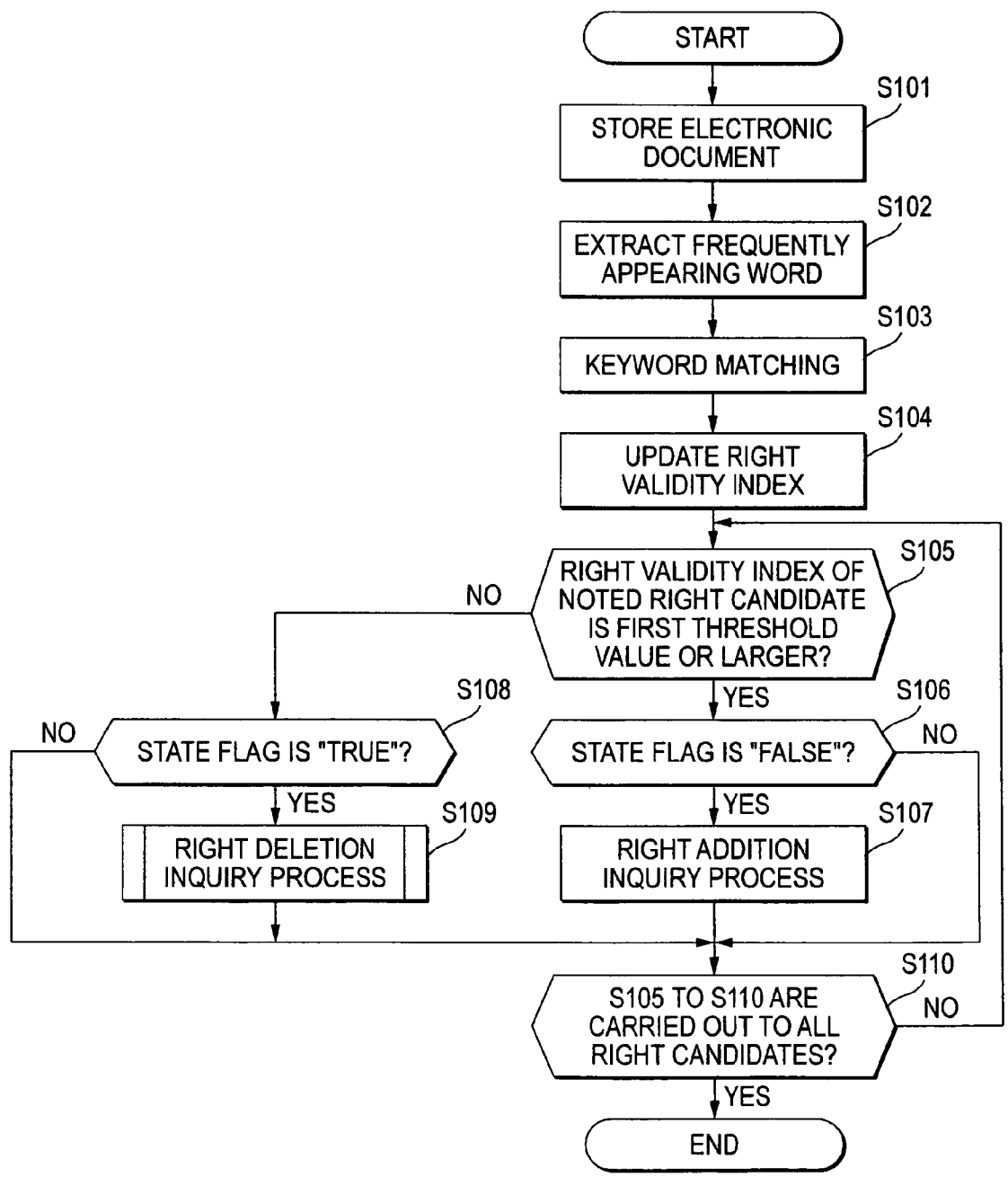

FIG. 11

RIGHT CANDIDATE DATA BASE

KEYWORD DATA BASE

| RIGHT CANDIDATE | KEYWORD |
|---|---|
| SECURITY | CERTIFICATION, PASSWORD, SECURITY |
| HEAD OF DEPARTMENT | SECRET |
| PATENT | LAID-OPEN PATENT APPLICATION, FILED PATENT APPLICATION, REQUEST FOR EXAMINATION |
| PROGRAMMER | Java, ruby, C#, C++ |
| IMPROVEMENT OF QUALITY | . . . |

STATICAL KEYWORD DATA BASE

| RIGHT CANDIDATE | KEYWORD CANDIDATE | KEYWORD VALIDITY INDEX | STATE FLAG |
|---|---|---|---|
| SECURITY | CERTIFICATION | 80 | TRUE |
|  | PASSWORD | 80 | TRUE |
|  | SECURITY | 55 | TRUE |
| PATENT | LAID-OPEN PATENT APPLICATION | 70 | TRUE |
|  | FILED PATENT APPLICATION | 85 | TRUE |
|  | REQUEST FOR EXAMINATION | 70 | TRUE |
| ~ | ~ | ~ | ~ |
| IMPROVEMENT OF QUALITY | . . . | . . . | . . . |

FIG. 12

RIGHT CANDIDATE DATA BASE

KEYWORD DATA BASE

| RIGHT CANDIDATE | KEYWORD |
|---|---|
| SECURITY | PASSWORD |
| HEAD OF DEPARTMENT | SECRET |
| PATENT | LAID-OPEN PATENT APPLICATION, FILED PATENT APPLICATION, REQUEST FOR EXAMINATION |
| PROGRAMMER | Java, ruby, C#, C++ |
| IMPROVEMENT OF QUALITY | . . . |

STATICAL KEYWORD DATA BASE

| RIGHT CANDIDATE | KEYWORD CANDIDATE | KEYWORD VALIDITY INDEX | STATE FLAG |
|---|---|---|---|
| SECURITY | CERTIFICATION | 45 | FALSE |
|  | PASSWORD | 80 | TRUE |
|  | SECURITY | 30 | FALSE |
| PATENT | LAID-OPEN PATENT APPLICATION | 70 | TRUE |
|  | FILED PATENT APPLICATION | 85 | TRUE |
|  | REQUEST FOR EXAMINATION | 70 | TRUE |
| ~ | ~ | ~ | ~ |
| IMPROVEMENT OF QUALITY | . . . | . . . | . . . |

DOCUMENT PROCESSOR AND COMPUTER READABLE MEDIUM

CROSS-REFERENCE TO RELATED APPLICATIONS

This application is based on and claims priority under 35 U.S.C. 119 from Japanese Patent Application No. 2007-159393 filed Jun. 15, 2007.

BACKGROUND

1. Technical Field

The present invention relates to a document processor and a computer readable medium.

2. Related Art

There are systems that register and manage information of a user and information of a using right to the document of the user.

SUMMARY

According to an aspect of the present invention, a document processor including: a processing unit that performs a process instructed by a user to an electronic document; a first storing unit that stores at least one of keywords of an attribute element respectively for a plurality of attribute elements; a second storing unit that coordinates at least one attribute element of the plurality of attribute elements with a user, and that stores the at least one attribute element coordinated with the user; a determining unit that determines whether or not the keyword stored in the first storing unit is included in the electronic document processed by the processing unit; an attribute element specifying unit that specifies the attribute element of the plurality of attribute elements satisfying a prescribed condition on the basis of a keyword determined to be included in the electronic document by the determining unit; and an inquiry unit that inquires about whether or not the attribute element specified by the attribute element specifying unit is allowed to be stored in the second storing unit.

BRIEF DESCRIPTION OF THE DRAWINGS

Exemplary embodiment of the present invention will be described in detail based on the following figures, wherein:

FIG. 5 is a diagram showing one example of contents stored in a right candidate data base;

FIG. 6 is a flowchart diagram showing one example of processes carried out by the document processor according to the embodiment of the present invention;

FIG. 11 is a diagram showing one example of contents stored in the right candidate data base;

FIG. 12 is a diagram showing one example of contents stored in the right candidate data base.

DETAILED DESCRIPTION

Figure 1:
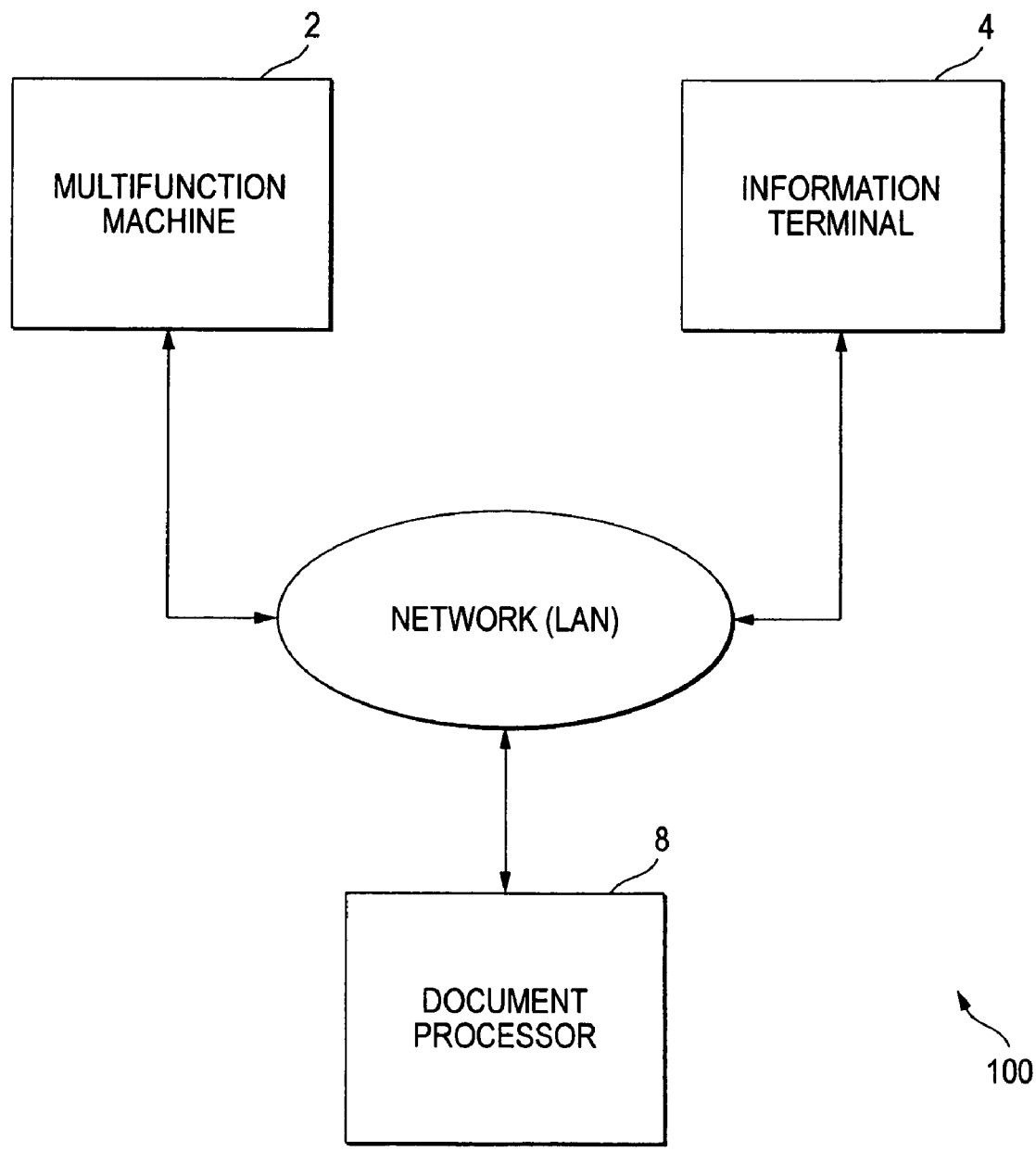
FIG. 1 is a diagram showing one example of a structure of a document processing system according to an embodiment of the present invention.

An embodiment of the present invention will be described by referring to the drawings. FIG. 1 is one example of a block diagram of a document processing system 100 according to an embodiment of the present invention. As shown in FIG. 1, the document processing system 100 includes a compound machine 2, an information terminal 4 and a document processor 8. The compound machine 2 or the information terminal 4 is connected to the document processor 8 through a network (for instance, a local area network) so as to communicate with the document processor 8. In this embodiment, the document processing system 100 is employed in one organization (for instance, an enterprise).

The compound machine 2 and the information terminal 4 are used by a user of a component or a member of the organization. The user logs in the document processor 8 from the compound machine 2 or the information terminal 4 to instruct various kinds of processes to the document processor 8. In this embodiment, the user registers an electronic document in the document processor 8 from the compound machine 2 or the information terminal 4, or inspects or edits the already registered electronic document.

The compound machine 2 receives an operation of the user to transmit an instruction of various kinds of processes to the document processor 8. For instance, when the electronic document is registered in the document processor 8, the compound machine 2 transmits to the document processor 8 an instruction to register a document image read by a scanner.

The information terminal is, for instance, a personal computer. The information terminal 4 also receives the operation of the user to transmit to the document processor 8 an instruction of various kinds of processes. For instance, when the electronic document is registered in the document processor 8, the compound machine 2 transmits an instruction to register document information (for instance, text data) designated by the user to the document processor 8.

The document processor 8 is an ordinary server device having a web server function. The document processor 8 carries out the processes in accordance with the instructions received from the compound machine 2 or the information terminal 4. Further, the document processor 8 stores and manages various kinds of information. For instance, the document processor 8 stores the electronic documents respectively registered by the users and attribute information the users. Here, the document processor 8 stores the rights of the users respectively held in the system as the attribute information of the users. Here, the rights of the users are respectively registered by the manager of the document processor 8. Specifically, the manager selects and registers the rights respectively to be held by the users from a plurality of predetermined right candidates. The users may respectively register the rights of themselves from the information terminal 4.

Figure 2:
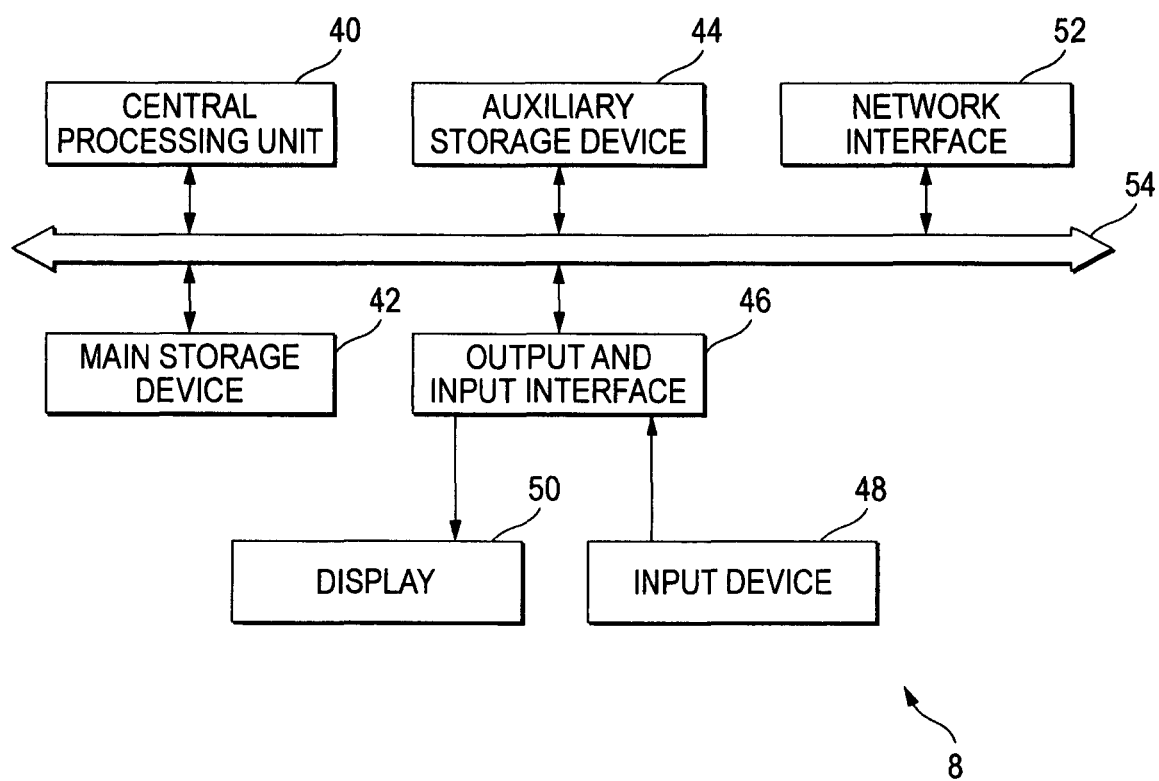
FIG. 2 is a diagram showing one example of a structure of a document processor according to the embodiment of the present invention.

FIG. 2 is a diagram showing one example of the structure of hardware of the document processor 8. As shown in FIG. 2, the document processor 8 includes a central processing unit 40, a main storage device 42, an auxiliary storage device 44, an output and input interface 46, an input device 48, a display 50 and a network interface 52. The devices are respectively connected together through a data bus 54 so as to communicate.

The central processing unit 40 is a CPU or an MPU and operates in accordance with a program previously stored in the main storage device 42 to control the devices respectively. Further, the central processing unit 40 calculates by using information stored in the main storage device 42 to output a result to the main storage device 42. The above-described program is not limited to a program stored in the main storage device 42 and may be stored in an information storing medium such as a CD-ROM, a DVD-ROM or the like, or may be provided from a network.

The main storage device 42 is a memory element such as a RAM, a ROM or the like to store the above-described program. Further, the main storage device 42 stores calculating information inputted from the central processing unit 40 or information inputted from the output and input interface. Further, the main storage device 42 outputs the stored information to the display 50 or the network interface 52 via the output and input interface.

The auxiliary storage device 44 is a hard disk to store the information stored in the main storage device 42 in accordance with a control signal from the central processing unit 40.

The input device 48 is a keyboard or a mouse to output input information to the main storage device 42 via the output and input interface in accordance with the control signal from the central processing unit 40.

The display 50 displays the information stored in the main storage device 42 in accordance with the control signal from the central-processing unit 40.

The network interface 52 is a network interface card to output information received from the network to the main storage device 42 or transmit the information stored in the main storage device 42 via the network in accordance with the control signal from the central processing unit 40.

Figure 3:
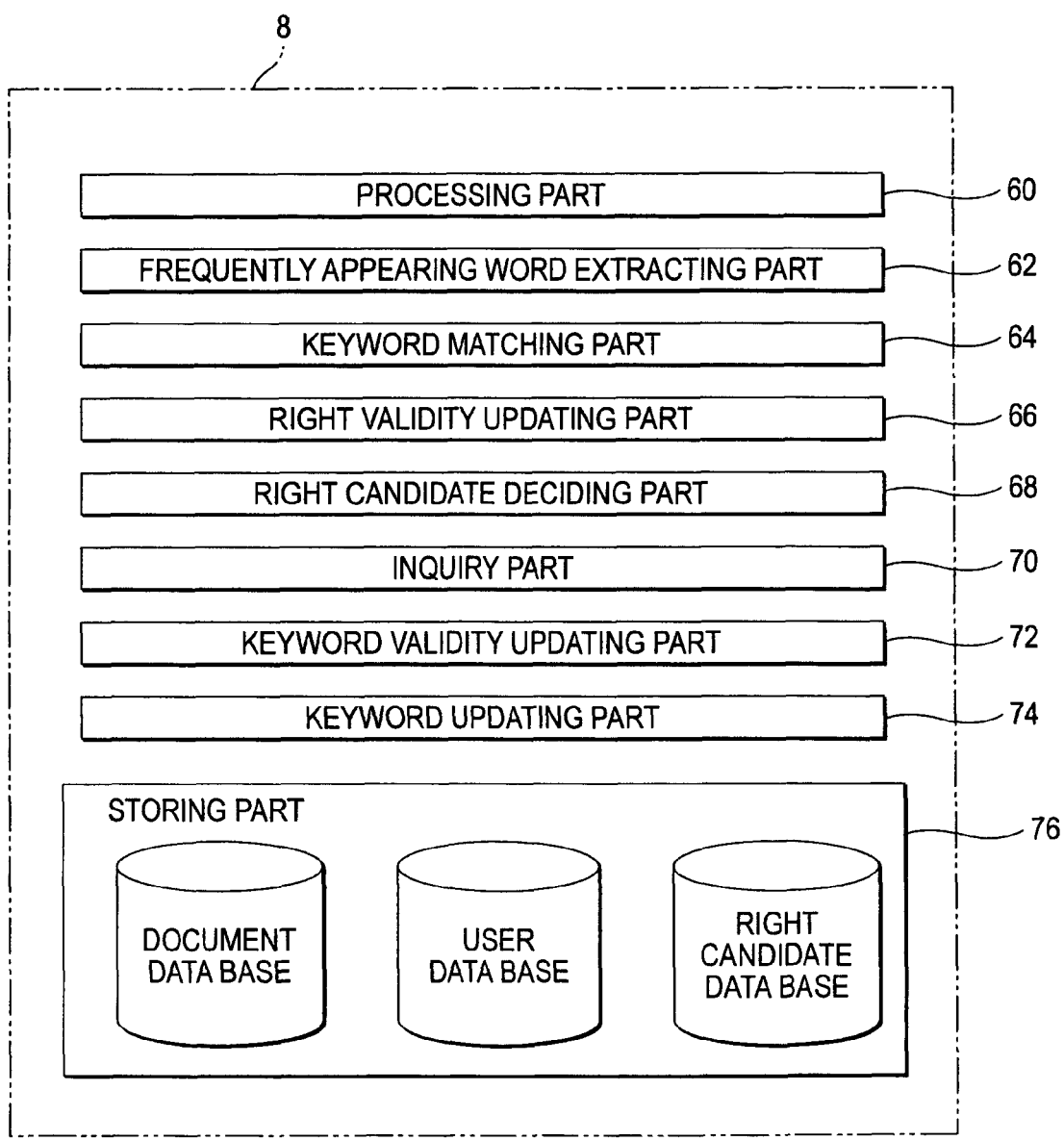
FIG. 3 is a diagram showing one example of a functional block of the document processor according to the embodiment of the present invention.

FIG. 3 is a block diagram of functions realized by the document processor 8 under the operation of the central processing unit 40 in accordance with the above-described program. Here, functions related to the present invention of the functions realized by the document processor 8 will be mainly shown.

A storing part 76 is realized mainly by the auxiliary storage device 44. In the storing part 76, a user data base, a document data base and a right candidate data base are stored. It is to be understood that other information than these data base is stored.

In the document data base, the electronic document is stored.

Figure 4:
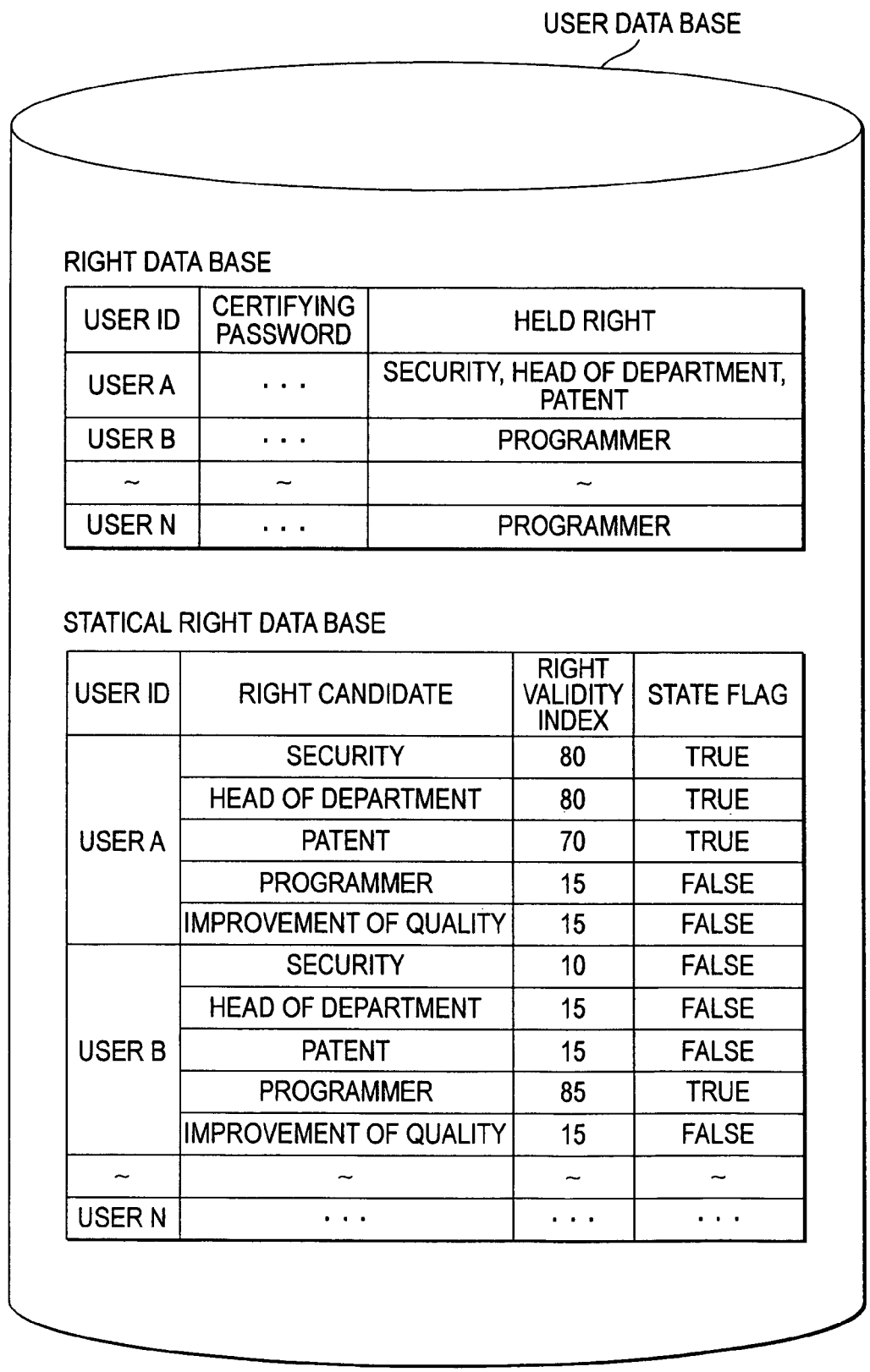
FIG. 4 is a diagram showing one example of contents stored in a user data base.

In the user data base, information related respectively to the users is stored. FIG. 4 is a diagram showing one example of the stored contents of the user data base. As shown in FIG. 4, the user data base includes a right data base and a statistical right data base. The right data base stores the records of the users respectively. The record of each user includes the certifying information of the user (a user ID, a certifying password). Further, the record of each user also includes the right held by the user as the attribute information of the user.

The statistical right data base stores the record each of the users so as to be coordinated for each user. In the statistical right data base, the record of each of the users includes a right validity index and a state flag of each right candidate. In this embodiment, the right validity index designates numerical information in which a lower limit value (here, it is set to "0") and an upper limit value (here, it is set to "100") are determined. The state flag of the right candidate indicates whether or not the user holds the right candidate. For instance, referring to the right data base, since a user A holds a security right, the right of a head of a department and a patent right, in the record of the user A of the statistical right data base, the state flags of these right candidates indicate "TRUE" and the state flags of other right candidates than the above-described right candidates indicate "FALSE".

In the right candidate data base, information related to each of the right candidates is stored. FIG. 5 is a diagram showing one example of the stored contents of the right candidate data base. As shown in FIG. 5, the right candidate data base includes a keyword data base and a statistical keyword data base. The keyword data base stores the record of each of the right candidates so as to be coordinated therewith for each right candidate. The record of each of the right candidates includes the keyword of the right candidate.

The statistical keyword data base also stores the record of each of the right candidates so as to be coordinated therewith for each right candidate. In the statistical keyword data base, the record of each of the right candidates includes at least one keyword candidate, a keyword validity index of each keyword candidate and a state flag of each keyword candidate. In this embodiment, the keyword validity index designates numerical information in which a lower limit value (here, it is set to "0") and an upper limit value (here, it is set to "100") are determined. The state flag of each keyword candidate indicates whether or not the keyword candidate is included in the record of the same right candidate in the keyword data base. For instance, referring to the keyword data base, since two keywords of a "certification" and a "password" are included in the record of the security right, in the record of the security right held by the statistical keyword data base, the state flags of these keyword candidates indicate "TRUE" and the state flag of other keyword candidate than the above-described keyword candidates (here, "security") indicates "FALSE".

A processing part 60 is mainly realized by the central processing unit 40. The processing part 60 certifies and specifies the user on the basis of the certifying information received by the network interface 52. The processing part 60 carries out various kinds of processes in accordance with instructions for processes received by the network interface 52. For instance, the processing part 60 stores the electronic document in the document data base or reads and updates the electronic document already stored in the document data base to process the electronic document.

Further, the processing part 60 receives an input based on the prescribed operation of the manager from the input device 48 to change the right held by each user. For instance, the processing part 60 additionally stores a new right in the record of the user held by the right data base or deletes the right from the record of the user.

A frequently appearing word extracting part 62 extracts a noun (a frequently appearing word) that frequently appears in the electronic document from the electronic document processed by the processing part 60. In this embodiment, the frequently appearing word extracting part 62 analyzes the electronic document processed by the processing part 60 to extract text data. For instance, when the electronic document is a document image, an OCR process is carried out to extract the text data. Then, the frequently appearing word extracting part 62 carries out a well-known important sentence extracting process to extract the frequently appearing word that frequently appears a prescribed frequency or more. The frequently appearing word extracting part 62 may extract all nouns included in the electronic document irrespective of the degree of frequent appearance. The electronic document processed by the processing part 60 is referred to as a document to be processed, hereinafter.

A keyword matching part 64 is realized mainly by the central processing unit 40. The keyword matching part 64 determines whether or not the keyword stored in the keyword data base is included in the document to be processed. In this embodiment, the keyword matching part 64 determines whether or not the keyword corresponds to any of the frequently appearing words extracted by the frequently appearing word extracting part 62 for each keyword stored in the keyword data base.

A right validity updating part 66 is realized mainly by the central processing unit 40. The right validity updating part 66 increases the right validity index of the right candidate corresponding to the keyword determined to be included in the electronic document.

In this embodiment, the right validity updating part 66 refers to the keyword data base to specify the right candidate corresponding to the keyword determined to correspond to any of the frequently appearing words, and refers to the statistical right data base to increase the right validity index of the right validity index of the specified right candidate in the record of the user certified by the processing part 60.

A right candidate determining part 68 is realized mainly by the central processing unit 40. The right candidate determining part 68 refers to the statistical right data base to determine whether or not the right validity index of each right candidate is a first threshold value (here, it is set to "50") or larger for each user.

In this embodiment, the right candidate determining part 68 refers to the record of the users certified by the processing part 60 in the stored contents of the statistical right data base to determine whether or not the right validity index is the first threshold value or larger for each right candidate.

An inquiry part 70 is realized mainly by the central processing unit 40. The inquiry part 70 inquires the manager about whether or not the right held by the user is changed for each user on the basis of the result of a decision by the right candidate determining part 68.

Figure 9A:
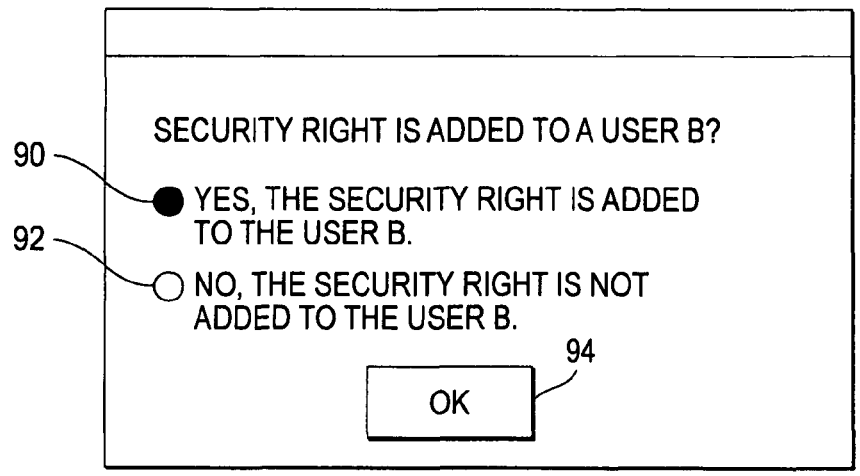
FIG. 9 is one example of an interface shown on a display of the document processor according to the embodiment of the present invention.
Figure 9B:
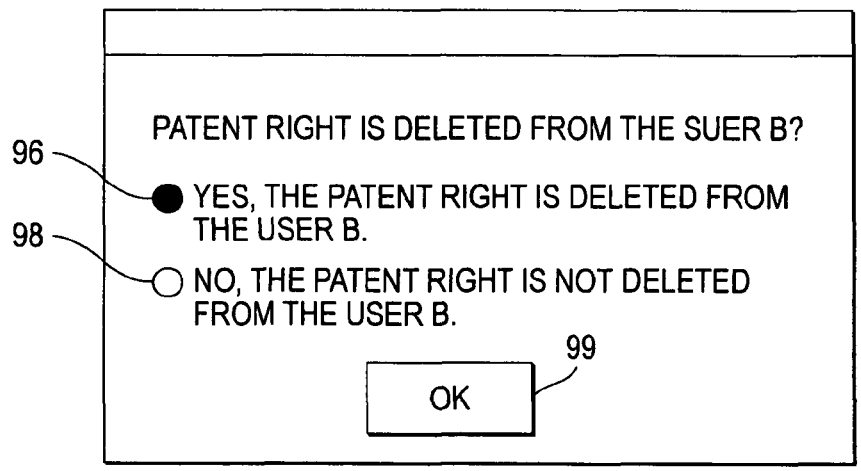
Figure 9C:
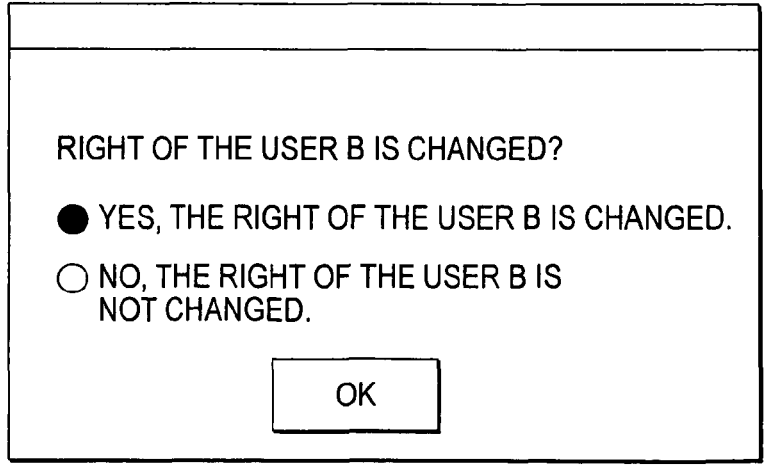

In this embodiment, when the inquiry part 70 refers to the right data base and the right candidate whose right validity index is determined to be the first threshold value or larger is not included in the record of the user certified by the processing part 60, the inquiry part 70 shows an interface (see FIG. 9A) for inquiring the manager about whether or not the right candidate is added to the right held by the user on the display 50. Further, when the inquiry part 70 refers to the right data base and the right candidate whose right validity index is determined to be smaller than the first threshold value is included in the record of the user certified by the processing part 60, the inquiry part 70 shows an interface (see FIG. 9B) on the display 50 to inquire of the manager whether or not the right candidate is deleted from the right held by the user. The inquiry part 70 displays an interface shown in FIG. 9C on the display 50 to inquire about the addition of the right candidate and the deletion of the right candidate at the same time.

A keyword validity updating part 72 is realized mainly by the central processing unit 40. When the right candidate whose right validity index is the first threshold value or higher is additionally stored in the record of any user in the right data base, the keyword validity updating part 72 increases the keyword validity index included in the record of the right candidate.

A keyword updating part 74 is realized mainly by the central processing unit 40. The keyword updating part 74 refers to the statistical keyword data base to select at least one keyword candidate from the record of the right candidate for each right candidate and stores the selected keyword candidate respectively in the keyword data base as the keyword of the right candidate.

In this embodiment, the keyword updating part 74 refers to the record of the additionally stored right candidate to select the keyword candidate whose keyword validity index is a prescribed second threshold value (here, it is set to "50") or larger. Then, when the keyword updating part 74 refers to the keyword data base and the selected keyword candidate is not included in the record of the additionally stored right candidate, the keyword updating part 74 additionally stores the selected keyword candidate in the record.

Figure 7:
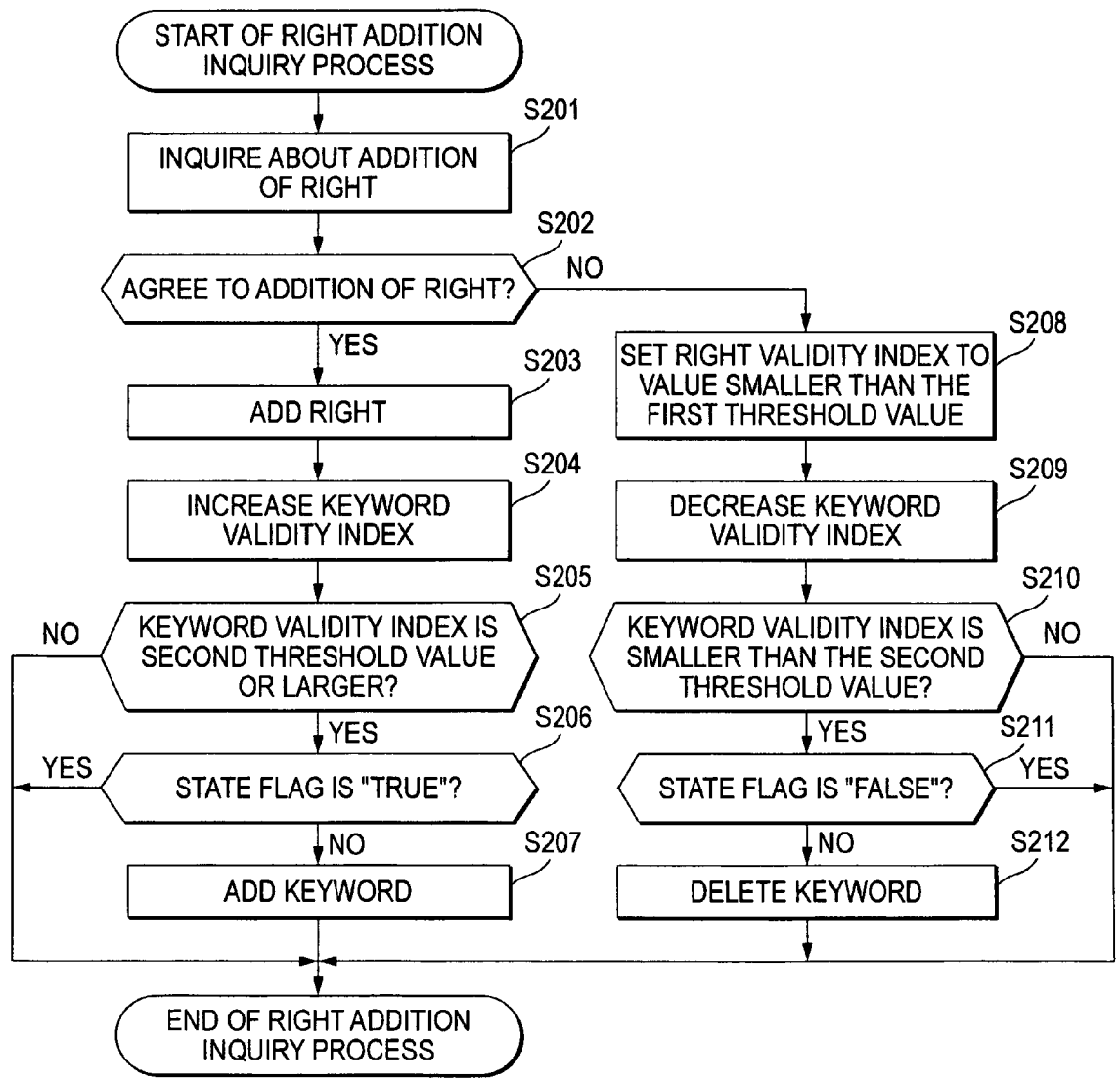
FIG. 7 is a flowchart diagram showing one example of a right addition inquiry process carried out by the document processor according to the embodiment of the present invention.
Figure 8:
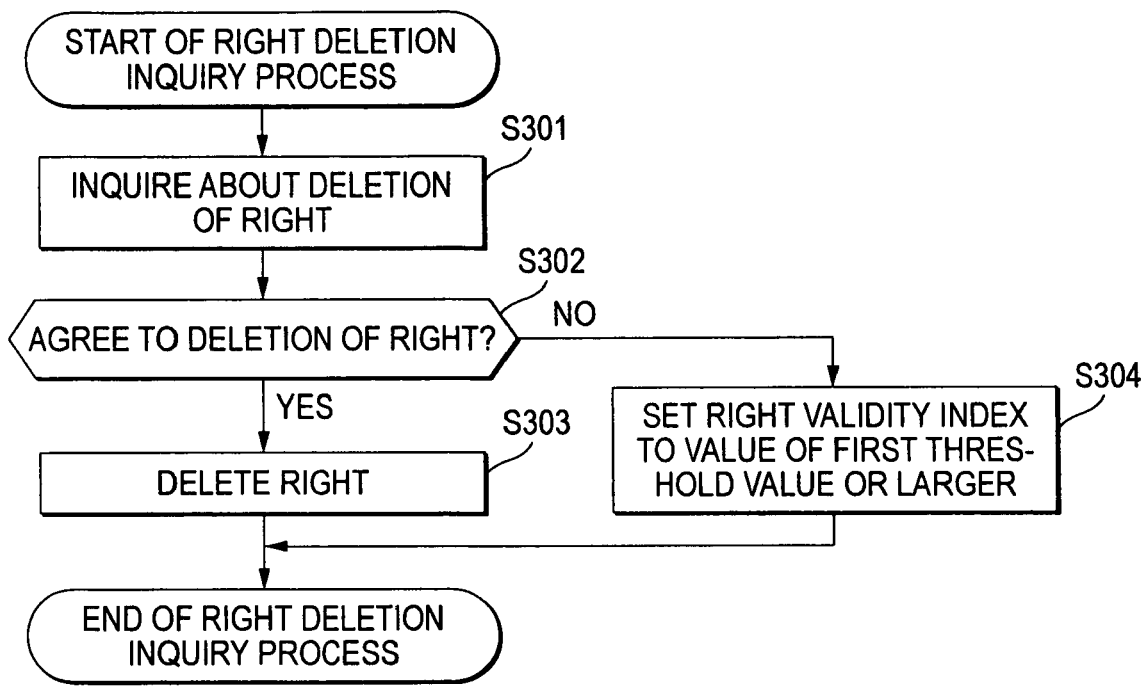
FIG. 8 is a flowchart diagram showing one example of a right deletion inquiry process carried out by the document processor according to the embodiment of the present invention.

Now, one example of processes will be described that are carried out by the document processor 8 having the above-described functions when the document processor receives instructions of processes to the electronic document from the compound machine 2 or the information terminal 4 of the user by referring to flow chart diagrams of FIGS. 6 to 8. Here, a case is described as an example that the document processor 8 receives an instruction to register the electronic document, however, when the document processor 8 receives an instruction to read or update the already registered electronic document, the document processor 8 may carry out the same processes. Here, it is assumed that the document processor 8 already specifies the user (refer it to as an object user, hereinafter) on the basis of the certifying information of the user.

The document processor 8 processes the electronic document in accordance with an instruction of a process received from the compound machine 2 or the information terminal 4. Here, when the document processor 8 receives the instruction for registering the electronic document, the document processor 8 stores the electronic document in the document data base (S101).

Then, the document processor 8 analyzes the electronic document (refer it to as a document to be processed, hereinafter) processed in the step of S101 to extract the frequently appearing word (S102). Specifically, the document processor 8 analyzes the document to be processed to extract the text data. For instance, when the object to be processed is image data, the document processor carries out the OCR process to extract the text data. Then, the document processor 8 carries out the known important sentence extracting process to extract the frequently appearing word that frequently appears a prescribed frequency or more. When the frequently appearing word that appears frequently a prescribed frequency or more is not extracted, the document processor 8 finishes the processes.

Then, the document processor 8 determines whether or not the keyword corresponds to any of the frequently appearing words extracted in the step of S102 for each keyword stored in the keyword data base (S103).

Then, the document processor 8 refers to the statistical right data base to update the right validity index of each right candidate included in the record of the object user on the basis of the result of a decision in the step of S103 (S104).

Specifically, the document processor 8 refers to the keyword data base to specify the right candidate corresponding to the keyword determined to correspond to any of the frequently appearing words, increases the right validity index of the specified right candidate by a prescribed value in the record of the object user held by the statistical right data base and decreases the right validity index of other right candidate than the specified right candidate by a prescribed value.

For instance, a case will be considered in which when a user B registers the electronic document, the document processor 8 extracts the "certification" as the frequently appearing word. In this case, the document processor 8 refers to the keyword data base to specify the security right as the right candidate corresponding to the "certification" and increases the right validity index of the security right included in the record of the user B by the prescribed value. Further, the document processor 8 respectively decreases the right validity index of other right candidate than the security right by the prescribed value.

Then, the document processor 8 selects one right candidate (refer it to as a noted right candidate, hereinafter). Then, the document processor 8 refers to the record of the object user held by the statistical right data base to determine whether or not the right validity index of the selected noted right candidate is the first threshold or higher (S105).

When the right validity index of the noted right candidate is the first threshold value or higher (Y of S105), the document processor 8 determines whether the noted right candidate is not included in the record of the object user held by the right data base (S106). Specifically, the document processor 8 refers to the record of the object user held by the statistical right data base to recognize whether or not the state flag of the noted right candidate shows "FALSE".

Then, when the noted right candidate is not included in the record of the object user held by the right data base (Y of S106), the document processor 8 carries out a below-described right addition inquiry process shown in FIG. 7 (S107) and advances to the step of S110. On the other hand, when the noted right candidate is included in the record of the object user held by the right data base (N of S106), the document processor 8 advances to the step of S110.

On the other hand, when the right validity index of the noted right candidate is smaller than the first threshold value (N of S105), the document processor 8 determines whether or not the noted right candidate is included in the record of the object user held by the right data base (S108). Specifically, the data processor 8 refers to the record of the object user held by the statistical data base to recognize whether or not the state flag of the noted right candidate shows "TRUE".

When the right validity index of the noted right candidate is smaller than the first threshold value (N of S105), the document processor 8 may further determine whether or not the right validity index of the noted right candidate is smaller than other prescribed threshold values different form the first threshold value. In this case, other threshold values are considered to be set to the first threshold value or smaller. Then, when the right validity index of the noted right candidate is smaller than other prescribed threshold values, the document processor 8 may advance to the step of S108. When the right validity index is other prescribed value or larger, the document processor 8 may advance to the step of Ss10.

In the step S108, when the noted right candidate is included in the record of the object user held by the right data base (Y of S108), the document processor 8 carries out a below-described right deletion inquiry process (S109) shown in FIG. 8 and advances to the step of S110. On the other hand, when the noted right candidate is not included in the record of the object user held by the right data base (N of S108), the document processor advances to the step of S110.

In the step of S110, the document processor 8 determines whether or not the processes of S105 to S109 are carried out to all the right candidates. Then, when the processes of S105 to S109 are not carried out yet to at least one of the right candidates (N of S110), the document processor 8 selects another noted right candidate to advance to the step of S105. On the other hand, when the processes of S105 to S109 are carried out to all the right candidates (Y of S110), the document processor 8 finishes the processes. Here, the document processor 8 sequentially carries out the processes of S105 to S109 respectively to the right candidates, however, these processes may be carried out in parallel respectively for the right candidates.

Now, the right addition inquiry process will be described by referring to FIG. 7. In this process, the document processor 8 initially inquires the manager about whether or not the noted right candidate is added to the right held by the object user (S201). Specifically, the document processor 8 shows the interface see FIG. 9A) on the display 50.

The document processor 8 monitors whether or not the manager receives an additional operation for checking a check box 90 and pressing down a button image 94 (S202). When the manager receives the additional operation (Y of S202), the document processor 8 additionally stores the noted right candidate in the record of the object user held by the right data base (S203). Further the document processor 8 updates the state flag of the noted right candidate from "FALSE" to "TRUE" in the record of the object user held by the statistical right data base.

Figure 10:
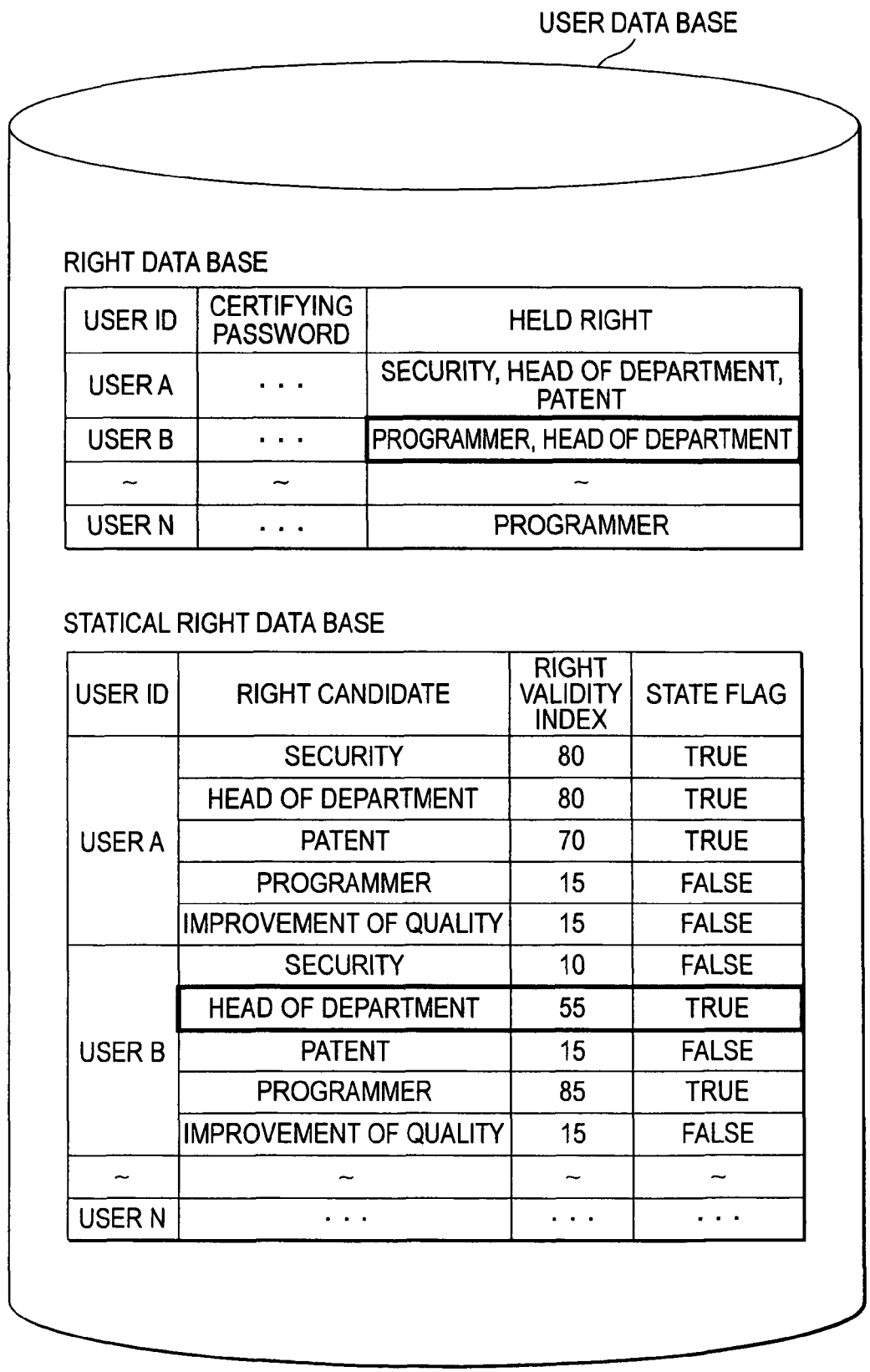
FIG. 10 is a diagram showing one example of contents stored in the user data base.

For instance, when a value of the right validity index of the right of a head of a department corresponding to the record of the user B becomes the first threshold value or larger from a state shown in FIG. 4, the document processor 8 inquires about whether or not the right of the head of the department is added to the right held by the user B. Then, when the document processor 8 receives the above-described additional operation, the document processor 8 additionally stores the right of the head of the department in the record of the user B held by the right data base to change the state flag of the right of the head of the department to "TRUE" from "FALSE" (see FIG. 10).

Then, the document processor 8 increases the keyword validity index by a prescribed value in the record of the noted right candidate held by the statistical keyword data base (S204).

Specifically, the document processor 8 refers to the statistical keyword data base to compare each of the keyword candidates included in the record of the noted right candidate with each of the frequently appearing words extracted in the step of S102. Thus, the document processor specifies the keyword candidate of the keyword candidates included in the record of the noted right candidate that corresponds to any of the frequently appearing words. Then, the document processor 8 increases the keyword validity index of the specified keyword candidate by a prescribed value.

As a result of the comparison, when the frequently appearing words extracted in the step of S102 include a frequently appearing word that does not correspond to any of the keyword candidates, the document processor 8 may regard the frequently appearing word as a new keyword candidate of the noted right candidate and additionally store the new keyword candidate in the record of the noted right candidate. In this case, the document processor 8 additionally stores the keyword validity index of the additionally stored keyword candidate and the state flag. At this time, a lower limit value is set to a value of the additionally stored keyword validity index and "FALSE" is set to the additionally stored state flag.

Then, the document processor 8 refers to the statistical keyword data base to determine whether or not the keyword validity index of the keyword candidate specified in the step of S204 is the second threshold value or larger (S205).

When the keyword validity index of the keyword candidate specified in the step of S204 is smaller than the second threshold value (N of S205), the document processor 8 directly finishes the processes.

On the other hand, when the keyword validity index of the keyword candidate specified in the step of S204 is the second threshold value or larger (Y of S205), the document processor 8 refers to the keyword data base to determine whether or not the keyword candidate is included in the record of the noted right candidate held by the keyword data base (S206). Specifically, the document processor 8 refers to the record of the noted right candidate held by the statistical keyword data base to determine whether or not the state flag of the keyword candidate shows "TRUE".

Then, when the keyword candidate specified in the step of S204 is included in the record of the noted right candidate held by the keyword data base (Y of S206), the document processor 8 directly finishes the processes. On the other hand, when the keyword candidate specified in the step of S204 is not included in the record of the noted right candidate held by the keyword data base (N of S206), the keyword candidate is regarded as a new keyword of the noted right candidate and the keyword candidate is additionally stored in the record of the noted right candidate (S207). At this time, the document processor 8 updates the state flag of the additionally stored keyword candidate from "FALSE" to "TRUE" in the record of the noted right candidate held by the statistical keyword data base.

For instance, when a value of the keyword validity index of a keyword candidate "security" corresponding to the security right becomes the second threshold value or larger from a state shown in FIG. 5, "security" is additionally stored in the record of the security right held by the keyword data base and the state flag is changed from "FALSE" to "TRUE" (see FIG. 11).

On the other hand, when the manager receives an addition negating operation for checking a check box 92 and pressing down the button image 94 (N of S2102), the document processor 8 sets the right validity index of the noted right candidate to any of values smaller than the first threshold value in the statistical right data base (S208). For instance, the right validity index may be set to a value half as small as the first threshold value.

Then, the document processor 8 decreases the keyword validity index by a prescribed value in the record of the noted right candidate held by the statistical keyword data base (S209).

Specifically, the document processor 8 refers to the statistical keyword data base to compare each of the keyword candidates included in the record of the noted right candidate with each of the frequently appearing words extracted in the step of S102. Thus, the document processor specifies the keyword candidate of the keyword candidates included in the record of the noted right candidate that corresponds to any of the frequently appearing words. Then, the document processor 8 decreases the keyword validity index of the specified keyword candidate by a prescribed value.

Then, the document processor 8 refers to the statistical keyword data base to determine whether or not the keyword validity index of the keyword candidate specified in the step of S209 is smaller than the second threshold value (S210). It may be determined whether or not the keyword validity index of the keyword candidate specified in the step of S209 is smaller than other prescribed threshold values different from the second threshold value. In this case, other prescribed threshold values may be possibly considered to be set to the second threshold value or smaller.

Then, when the keyword validity index of the keyword candidate specified in the step of S209 is the second threshold value or larger (N of S210), the document processor 8 directly finishes the processes.

On the other hand, when the keyword validity index of the keyword candidate specified in the step of S209 is smaller than the second threshold value (Y of S210), the document processor 8 determines whether the keyword candidate is not included in the record of the noted right candidate held by the keyword data base (S211). Specifically, the document processor 8 refers to the record of the noted right candidate held by the statistical keyword data base to determine whether or not the state flag of the keyword candidate shows "FALSE".

Then, when the keyword candidate specified in the step of S209 is not included in the record of the noted right candidate held by the keyword data base (Y of S211), the data processor 8 directly finishes the processes.

On the other hand, when the keyword candidate specified in the step of S209 is included in the record of the noted right candidate held by the keyword data base (N of S211), the data processor 8 deletes the keyword candidate from the record of the noted right candidate (S212). At this time, the document processor 8 updates the state flag of the deleted keyword candidate to "FALSE" from "TRUE" in the record of the noted right candidate held by the statistical keyword data base.

For instance, when a value of the keyword validity index of a keyword candidate "certification" corresponding to the security right is smaller than the second threshold value from a state shown in FIG. 5, "certification" is deleted from the record of the security right held by the keyword data base and the state flag is changed from "TRUE" to "FALSE" (see FIG. 12).

The above-described processes show the contents of the right addition inquiry process.

Now, the right deletion inquiry process will be described by referring to FIG. 8. In this process, the document processor 8 initially inquires the manager about whether or not the noted right candidate is deleted from the right held by the object user (S301). Specifically, the document processor 8 shows the prescribed interface (see (FIG. 9B) on the display 50.

The document processor 8 monitors whether or not a deleting operation is received for checking a check box 96 and pressing down a button image 99 (S302). When the document processor 8 receives the deleting operation (Y of S302), the document processor 8 deletes the noted right candidate from the record of the object user held by the right data base (S303). Further, the document processor 8 updates the state flag of the noted right candidate from "TRUE" to "FALSE" in the record of the object user held by the statistical right data base.

Figure 13:
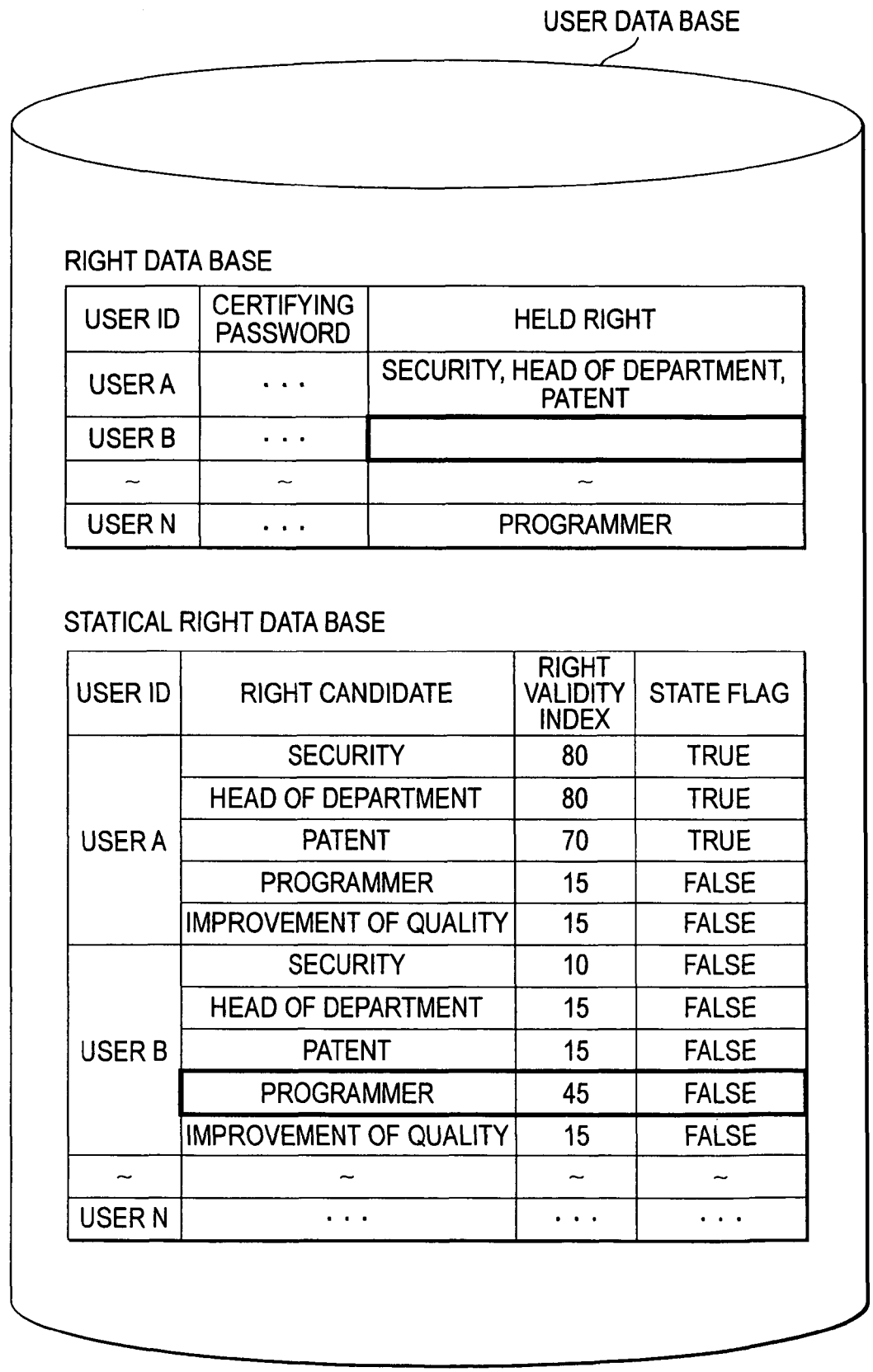
FIG. 13 is a diagram showing one example of contents stored in the user data base.

For instance, when a value of the right validity index of a programmer right corresponding to the record of the user B becomes a value smaller than the first threshold value from a state shown in FIG. 4, the document processor 8 inquires about whether or not the programmer right is deleted from the right held by the user B. Then, when the document processor 8 receives the above-described deleting operation, the document processor 8 deletes the programmer right from the record of the user B held by the right data base to change the state flag of the programmer right from "TRUE" to "FALSE" (see FIG. 13).

On the other hand, when the document processor receives a deletion negating operation for checking a check box 98 and pressing down the button image 99 (N of S302), the document processor 8 sets any of values of the first threshold value or larger to the right validity index of the noted right candidate in the record of the object user held by the statistical right data base (S304). For instance, the document processor 8 may set "a value half as large as the sum of an upper limit value of the right validity index ad the first threshold value" to the right validity index. The above-described processes show the right deletion inquiry process. Here, the addition of the right and the deletion of the right are separately inquired, however, they may be inquired at a time. For instance, the interface shown in FIG. 9C may be displayed on the display 50.

The embodiment of the present invention is not limited to the above-described embodiment.

Namely, in the above-described embodiment, as one example of the attribute information of the user, the right of the user is described. However, any information showing the attributes of the user may be employed. For instance, the attribute information may include information showing a job, a working place, a class of age, an urban and rural prefecture where the user lives, a position, etc. of the user.

Further, in the above-described embodiment, the manager of the document processor 8 is inquired about the addition or the deletion of the right, however, the user may be directly inquired about whether the right is added or deleted. For instance, the document processor 8 may display the interface shown in FIG. 9 on the information terminal 4 of the user.

Further, in the above-described embodiment, the document processor 8 carries out the processes of S105 to S110 at a timing of carrying out the processes to the electronic document, however, a below-described method may be considered. That is, the document processor 8 may periodically carry out the processes of S105 to S110. In this case, the processes of S105 to S110 may be possibly carried out to each user.

Further, when the processes of S105 to S110 are periodically carried out, a process for decreasing the right validity index (that is, a part of S104, S208) and the process of S304 may be omitted. In this case, after the processes of S105 to S110 are carried out, values of all right validity index are considered to be initialized to a lower limit value 0.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A document processor comprising:
    a processing unit that performs a process instructed by a user to an electronic document;
    a first storing unit that stores at least one keyword of an attribute element respectively for a plurality of attribute elements;
    a second storing unit that coordinates at least one attribute element of the plurality of attribute elements with a user, and that stores the at least one attribute element coordinated with the user;
    a determining unit that determines whether or not the at least one keyword stored in the first storing unit is included in the electronic document processed by the processing unit;
    an attribute element specifying unit that specifies the attribute element of the plurality of attribute elements satisfying a prescribed condition on the basis of a keyword determined to be included in the electronic document by the determining unit;
    an inquiry unit that inquires about whether or not the attribute element specified by the attribute element specifying unit is allowed to be stored in the second storing unit;
    a third storing unit that stores a first index value of the attribute element respectively for the plurality of attribute elements; and
    a first index value increasing unit that increases the first index value of the attribute element corresponding to the keyword determined to be included in the electronic document by the determining unit;
    wherein
    the attribute specifying unit specifies the attribute element on the basis of the first index value stored in the third storing unit.

2. The document processor as claimed in claim 1, wherein the attribute specifying unit specifies a attribute element having first index value being a prescribed threshold value or larger.

3. The document processor as claimed in claim 1, wherein the attribute element specifying unit specifies an attribute element having first index value being smaller than the prescribed threshold value.

4. The document processor as claimed in claim 1, wherein in a case where the attribute element specified by the attribute element specifying unit is not stored in the second storing unit, the inquiry unit inquires about whether or not the attribute element is additionally stored in the second storing unit.

5. The document processor as claimed in claim 4, further comprising:
    a keyword candidate storing unit that stores at least one keyword candidate so as to be coordinated with the plurality of attribute elements respectively; and
    a keyword registering unit that selects at least one keyword candidate from at least one of keyword candidates coordinated with the attribute element respectively for the plurality of attribute elements, and that registers at least one keyword candidate that is selected respectively in the first storing unit as the at least one keyword of the attribute element.

6. The document processor as claimed in claim 5, further comprising:
    a fourth storing unit that stores a second index value of the keyword candidate for each keyword candidate stored in the keyword candidate storing unit;
    an additionally registering unit that additionally registers the attribute element specified by the attribute specifying unit in the second storing unit; and
    a second index value increasing unit that increases the second index value of the keyword candidate coordinated with the attribute element in a case where the additionally registering unit additionally registers the attribute element specified by the attribute element specifying unit in the second storing unit in accordance with a reception of a prescribed operation,
    wherein
    the keyword registering unit selects the keyword candidate respectively for the plurality of attribute elements on the basis of the second index value stored in the fourth storing unit.

7. The document processor as claimed in claim 6, wherein the keyword registering unit selects a keyword candidate having second index value being a prescribed threshold value or higher respectively for the plurality of attribute elements.

8. The document processor as claimed in claim 6, further comprising:

a keyword candidate specifying unit that specifies the keyword candidate included in the electronic document of at least one keyword candidate coordinated with the attribute element specified by the attribute element specifying unit, wherein in a case where the additionally registering unit additionally registers the attribute element specified by the attribute element specifying unit in the second storing unit, the second index value increasing unit increases the second index value of the keyword candidate specified by the keyword candidate specifying unit.

9. The document processor as claimed in claim 3, wherein in a case where the attributer element specified by the attribute specifying unit is stored in the second storing unit, the inquiry unit inquires about whether or not the attribute element is restrained from being stored in the second storing unit.

10. The document processor as claimed in claim 1, further comprising:

a frequently appearing word extracting unit that extracts at least one frequently appearing word from the electronic document processed by the processing unit, wherein the determining unit determines whether or not the at least one keyword stored in the first storing unit corresponds to any of the frequently appearing words extracted by the frequently appearing word extracting unit.

11. A computer readable medium storing a program causing a computer to execute a process for performing a document processing, the process comprising:

performing a process instructed by a user to an electronic document;

storing at least one keyword of an attribute element respectively for a plurality of attribute elements;

coordinating at least one attribute element of the plurality of attribute elements with a user, and storing the at least one attribute element coordinated with the user;

determining whether or not the stored at least one keyword is included in the processed electronic document;

storing a first index value of the attribute element respectively for the plurality of attribute elements;

increasing the first index value of the attribute element corresponding to the keyword determined to be included in the electronic document, specifying the attribute element of the plurality of attribute elements satisfying a prescribed condition on the basis of a keyword determined to be included in the electronic document and on the basis of the first index value stored; and inquiring about whether or not the attribute element specified is allowed to be stored in the storing of the at least one attribute element.

* * * * *